UNITED STATES PATENT OFFICE.

ERNST BERTRAND, OF KLADNO, BOHEMIA, AUSTRIA-HUNGARY, ASSIGNOR TO THE POTTSTOWN IRON COMPANY, OF POTTSTOWN, PENNSYLVANIA.

BASIC PROCESS OF MAKING STEEL.

SPECIFICATION forming part of Letters Patent No. 408,572, dated August 6, 1889.

Application filed July 19, 1888. Serial No. 280,440. (No model.)

*To all whom it may concern:*

Be it known that I, ERNST BERTRAND, a citizen of the United States, at present residing at Kladno, Bohemia, Austria-Hungary, have invented certain Improvements in the Basic Process of Making Steel, of which the following is a specification.

My invention relates to the basic process of making steel, and the ultimate object had in view is to reduce to a minimum any injury to the lining of the vessels. For this purpose the amount of lime added to the charge is based upon the amount of silicon and phosphorus contained in the pig-iron in order to exactly neutralize the phosphoric acid and the silica formed by oxidation during the fore-blow. Sometimes this lime is added all at once before the blow begins, and sometimes part of it is added at the beginning and part after the change, or, in other words, at the beginning of the over-blow.

My invention consists of an improved mode of determining during the progress of the blow the amount of lime necessary to be added to the charge to exactly combine with or remove the silica present in the molten metal, as hereinafter described.

The phosphorus may be considered as a constant factor, and in practice I have the blast-furnace make this as regularly as possible at, say, 2.6 per cent. For this a constant weight or percentage of lime (say about eight per cent.) must be added to the heat. Since the silicon burns away in the fore-blow, and, further, since the carbon varies but little in the pig metal used for the basic process, the variations required in the length of fore-blow are in large part due to variations in the amount of silicon contained in the metal; but practice has demonstrated that it is impossible to determine by calculation how much air will be required to be blown into a given quantity of molten metal of any given accurately-known composition to produce the required results. Circumstances which it seems impossible to control or discover prevent this from being merely a mathematical problem. For instance, the air blown in will vary as to its moisture, and in every blow a certain variable amount of iron is oxidized and a certain other variable amount of air seems to be expended without effect on the bath.

I determine during the progress of the blow the amount of lime necessary to be added by the following method: By some suitable means I count the revolutions of the blowing-engines necessary for the fore-blow, and find by means of a prepared table the number of cubic yards of air per ton of metal charged. From this measurement of the amount of air blown in during the fore-blow (and it will vary with each heat) I am able to determine how much silicon that charge of metal contained. For convenience merely I have a table made out which shows how much percentage of lime must be used for the weight of metal charged. This table is based on the fact that a certain amount of silicon requires a certain amount of air to oxidize it, and that the silica produced will combine with a certain amount of lime. The variations from heat to heat are, however, rarely very great, and having once determined the amount of lime to be added the operator will know beforehand within a per cent. how much lime is needed. He therefore charges the lime a little short of what is thought to be required, and afterward adds at the beginning of the over-blow the half per cent. or one per cent., &c., as the case may be, which he finds by his measurement of the air blown in during the fore-blow to be necessary to complete the amount needed. It will not answer to charge a considerable excess of lime in the first instance, for this would not only be a waste of lime, but a waste also of the caloric of the metal required to heat up the lime, &c., in the converter. Blows with an excess of lime are always cold, so that the percentage of loss is slightly increased, the vessel-nose tends to clog up, and heavy "sculls" result in the ladles.

I claim as my invention—

As an improvement in the basic process of making steel, the mode herein described of determining during the progress of the blow the amount of lime necessary to be added to the charge to exactly neutralize, combine with, or remove the silica present in the molten metal, said mode consisting in measuring the amount of air blown into the charge during the fore-blow and then proportioning the lime to the said amount of air so blown in.

In testimony whereof I have signed my name to this specification in the presence of two subscribing witnesses.

ERNST BERTRAND.

Witnesses:
 GUSTAV MEECHY,
 ADOLF FISCHER.